(12) United States Patent
Liu et al.

(10) Patent No.: US 12,236,580 B2
(45) Date of Patent: Feb. 25, 2025

(54) DETECTION METHOD, ELECTRONIC DEVICE AND NON-TRANSITORY COMPUTER-READABLE STORAGE MEDIUM

(71) Applicant: BOE TECHNOLOGY GROUP CO., LTD., Beijing (CN)

(72) Inventors: Yongzhang Liu, Beijing (CN); Zhaoyue Li, Beijing (CN); Dong Chai, Beijing (CN); Hong Wang, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 18/543,121

(22) Filed: Dec. 18, 2023

(65) Prior Publication Data
US 2024/0119584 A1    Apr. 11, 2024

Related U.S. Application Data

(63) Continuation of application No. 17/417,487, filed as application No. PCT/CN2020/093281 on May 29, 2020, now Pat. No. 11,900,589.

(51) Int. Cl.
G06T 7/00        (2017.01)
G06V 10/764      (2022.01)
(Continued)

(52) U.S. Cl.
CPC ............ G06T 7/001 (2013.01); G06V 10/764 (2022.01); G06V 10/82 (2022.01);
(Continued)

(58) Field of Classification Search
CPC .... G06V 10/774; G06V 10/82; G06V 10/809; G06V 10/764; G06T 7/0004; G06T 7/73;
(Continued)

(56) References Cited

U.S. PATENT DOCUMENTS 9,092,842 B2    7/2015  Xu et al.
2003/0130806 A1  7/2003  Mizuno et al.
(Continued)

FOREIGN PATENT DOCUMENTS

CN    104749184 A    7/2015
CN    108846841 A    11/2018
(Continued)

OTHER PUBLICATIONS

Hanzawa et al "Data Generation Device, Data Generation Method, and Data Generation Program", Jun. 20, 2019, WO2019117068 A1. (Year: 2019).*
(Continued)

Primary Examiner — Sang H Nguyen
(74) Attorney, Agent, or Firm — HOUTTEMAN LAW LLC

(57) ABSTRACT

The present disclosure provides a detection method. The detection method includes inputting an image to be detected into a detection model being pre-constructed and detecting the image to be detected. The detection model includes a defect classification identification sub-model configured to identify a classification of a defect in the image to be detected, and the defect classification identification sub-model comprises a plurality of base models and a secondary model. The present disclosure further provides an electronic device and a non-transitory computer-readable storage medium.

13 Claims, 7 Drawing Sheets

(51) Int. Cl.
*G06V 10/82* (2022.01)
*G01N 29/44* (2006.01)

(52) U.S. Cl.
CPC .............. *G01N 29/4445* (2013.01); *G06T 2207/20081* (2013.01); *G06T 2207/20084* (2013.01); *G06T 2207/30121* (2013.01)

(58) Field of Classification Search
CPC ........... G06T 7/001; G06T 2207/30121; G06T 2207/20081; G06T 2207/20084; G01N 29/4445; G01N 29/4481; G01N 2201/06113; G01N 2021/8887; G01N 2021/8883; G01N 2021/479; G01B 11/162; G02B 21/0032
See application file for complete search history.

(56) References Cited

U.S. PATENT DOCUMENTS

| | | |
|---|---|---|
| 2012/0027286 A1 | 2/2012 | Xu et al. |
| 2016/0358041 A1 | 12/2016 | Venkataraman et al. |
| 2018/0322623 A1 | 11/2018 | Memo et al. |
| 2019/0096135 A1* | 3/2019 | Dal Mutto ........ G06F 18/24765 |
| 2019/0108396 A1* | 4/2019 | Dal Mutto ............. G06V 20/52 |
| 2019/0310554 A1 | 10/2019 | Middlebrooks et al. |
| 2019/0318469 A1 | 10/2019 | Wang |
| 2020/0143528 A1* | 5/2020 | Kulkarni ................... G06T 5/73 |
| 2020/0349875 A1 | 11/2020 | Wen et al. |
| 2020/0357109 A1 | 11/2020 | Wen et al. |

FOREIGN PATENT DOCUMENTS

| | | |
|---|---|---|
| CN | 108961238 A | 12/2018 |
| CN | 109064446 A | 12/2018 |

OTHER PUBLICATIONS

Zhang et al "A Product Surface Defect Detection Method, Electronic Device and Readable Storage Medium", Apr. 10, 2020, CN110992329 A (Year: 2020).*
Wen et al "A Method and Device for Detecting Steel Ladle Erosion Defect", Nov. 16, 2018, CN 108830837 A (Year: 2018).*
WIPO, International Search Report issued on Feb. 9, 2021.
USPTO, Notice of Allowance issued on Oct. 26, 2023 regarding the U.S. Appl. No. 17/417,487.

* cited by examiner

| Inputting a detection image of a display panel to be detected into a detection model and detecting the display panel to be detected, the detection model is pre-constructed and configured to detect the display panel | S100 |

DETECTION METHOD, ELECTRONIC DEVICE AND NON-TRANSITORY COMPUTER-READABLE STORAGE MEDIUM

This is a continuation application of U.S. patent application Ser. No. 17/417,487, filed on Jun. 23, 2021, a National Phase Application filed under 35 U.S.C. 371 as a national stage of PCT/CN2020/093281 filed on May 29, 2020, the content of each of which is hereby incorporated by reference in its entirety.

TECHNICAL FIELD

The present disclosure relates to the field of image recognition technology, and in particular to a detection method, an electronic device, and a non-transitory computer readable storage medium.

BACKGROUND

In recent years, with the popularization of various smart terminals and wearable devices, screens are widely used, and the requirements for production quality and efficiency of display panels of a manufacturer are also increasing. In the production process of the display panel, the defect detection of the display panel influences multiple links such as maintenance on a process route, process improvement and reproduction, so that the improvement of the efficiency and effect of the defect detection of the display panel is very important for the improvement of the productivity.

SUMMARY

The embodiment of the disclosure provides a detection device of a display panel, a detection method thereof, an electronic device and a computer readable medium.

In a first aspect, a detection device of a display panel includes:
an image receiver configured to receive a detection image of a display panel to be detected;
a detector configured to input the detection image of the display panel to be detected into a detection model and generate a detection result by the detection model, the detection model being pre-constructed and configured to detect the display panel;
the detection model includes:
a defect classification identification sub-model configured to identify a classification of a defect of the display panel to be detected;
a defect position identification sub-model configured to mark a position of the defect of the display panel to be detected;
wherein the defect classification identification sub-model includes a plurality of base models and a secondary model;
the plurality of base models are configured to determine an initial classification of the defect of the display panel to be detected;
the secondary model is configured to determine a final classification of the defect of the display panel to be detected according to input data obtained by integrating output data of the plurality of base models.

In some embodiments, the plurality of base models are obtained by respectively training a same Convolutional Neural Network model with a plurality of first training data sets satisfying different probability distributions.

In some embodiments, the plurality of first training data sets include sample sets obtained by respectively sampling an original data set according to different predetermined sampling ratios, the different predetermined sampling ratios are sampling ratios of detection images of different classifications of defects determined according to the different probability distributions, and the original data set includes a plurality of detection images of different display panels with known defects.

In some embodiments, the Convolutional Neural Network model includes a fully-connected layer, a supplementary convolution layer, a batch normalization layer, a random discard layer;
the supplementary convolution layer is configured to convolve data to be input into the fully-connected layer such that the data convolved by the supplementary convolution layer meets an input dimension of the fully-connected layer;
the batch normalization layer is configured to standardize the data to be input into the fully-connected layer;
the random discard layer is configured to randomly discard a part of neural network units of the Convolutional Neural Network model to avoid overfitting; and
when the Convolutional Neural Network model is trained, the fully-connected layer is initialized by a first algorithm, the fully-connected layer is regularized by a second algorithm, and the supplementary convolution layer is initialized by a third algorithm.

In some embodiments, the secondary model is a classifier including a plurality of fully-connected layers and a normalized exponential function layer.

In some embodiments, the defect position identification sub-model is an object detector.

In a second aspect, an embodiment of the present disclosure provides a detection method of a display panel, including:
inputting a detection image of a display panel to be detected into a detection model and detecting the display panel to be detected, the detection model being pre-constructed and configured to detect the display panel;
the detection model includes:
a defect classification identification sub-model configured to identify a classification of a defect of the display panel to be detected;
a defect position identification sub-model configured to mark a position of a defect of the display panel to be detected;
wherein the defect classification identification sub-model includes a plurality of base models and a secondary model;
the plurality of base models are configured to respectively determine an initial classification of a defect of the display panel to be detected; and
the secondary model is configured to determine a final classification of the defect of the display panel to be detected according to input data obtained by integrating output data of the plurality of base models.

In some embodiments, the plurality of base models are obtained by respectively training a same Convolutional Neural Network model with a plurality of first training data sets satisfying different probability distributions.

In some embodiments, the detection method further comprises generating the plurality of the first training data sets, which includes:

generating an original data set including a plurality of detection images of different display panels with known defects;

respectively determining sampling ratios of detection images of different classifications of defects corresponding to a plurality of probability distributions;

respectively sampling the original data set according to the sampling ratios of the detection images of different classifications of defects to obtain the plurality of first training data sets.

In some embodiments, the Convolutional Neural Network model includes a fully-connected layer, a supplementary convolution layer, a batch normalization layer, a random discard layer;

the supplementary convolution layer is configured to convolve data to be input into the fully-connected layer such that the data convolved by the supplementary convolution layer meets the input dimension of the fully-connected layer;

the batch normalization layer is configured to normalize the data to be input into the fully-connected layer;

the random discard layer is configured to randomly discard a part of neural network units of the Convolutional Neural Network model to avoid overfitting;

when training the Convolutional Neural Network model, the fully-connected layer is initialized by a first algorithm, the fully-connected layer is regularized by a second algorithm, and the supplementary convolution layer is initialized by a third algorithm.

In some embodiments, the secondary model is a classifier including a plurality of fully-connected layers and a normalized exponential function layer.

In some embodiments, the defect position identification sub-model is an object detector.

In a third aspect, an embodiment of the present disclosure provides an electronic device, including:

one or more processors;

a memory, one or more programs stored thereon, when the one or more programs are executed by the one or more processors, the one or more programs cause the one or more processors to perform any of the above detection methods of a display panel;

one or more I/O interfaces connected between the one or more processors and the memory, and configured to enable information interaction between the processor and the memory.

In a fourth aspect, the present disclosure provides a computer readable medium, a computer program stored thereon, when the computer program is executed by a processor, the computer program causes the processor to perform any one of the above detection methods of a display panel.

BRIEF DESCRIPTION OF THE DRAWINGS

The accompanying drawings provide a further understanding of the embodiments of the present disclosure, constitute a part of the description, and illustrate the present disclosure together with the embodiments of the present disclosure, and do not constitute a limitation of the present disclosure. The above and other features and advantages will become more apparent to a person skilled in the art by describing in detail exemplary embodiments thereof with reference to the accompanying drawings, in which.

DETAILED DESCRIPTION

In order to make a person skilled in the art better understand the technical solutions of the present disclosure, the following describes a detection device of a display panel, a detection method thereof, an electronic device, and a computer readable medium of the present disclosure in detail with reference to the accompanying drawings.

Example embodiments will be described more fully hereinafter with reference to the accompanying drawings, but which may be embodied in different forms and should not be construed as limited to the embodiments set forth herein. On the contrary, these embodiments are provided such that the present disclosure will be thorough and complete, and will fully convey the scope of the disclosure to a person skilled in the art.

Embodiments of the present disclosure and features of the embodiments may be combined with each other without conflict.

As used herein, the term "and/or" includes any and all combinations of one or more of the associated listed items.

The terms used herein are for the purpose of describing particular embodiments only and are not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by a person skilled in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1:
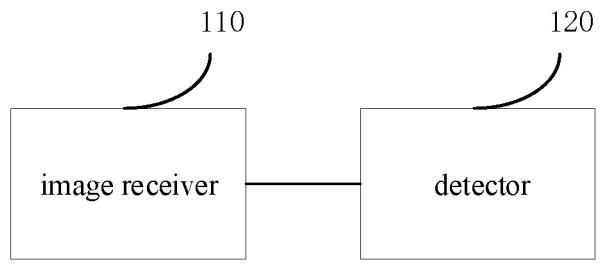
FIG. 1 is a block diagram of a detection device of a display panel according to an embodiment of the present disclosure.

In a first aspect, referring to FIG. 1, an embodiment of the present disclosure provides a detection device 100 of a display panel, including:

- an image receiver 110 configured to receive a detection image of a display panel to be detected;
- a detector 120 configured to input the detection image of the display panel to be detected into a detection model and generate a detection result by the detection model, the detection model being pre-constructed and configured to detect the display panel.

In the embodiment of the present disclosure, the detection image of the display panel to be detected includes a picture acquired by photographing of a display panel with an image acquisition device. For example, the display panel is photographed with an AOI device to acquire an AOI detection image. The AOI device is an equipment for detecting a display panel by scanning the display panel and acquiring images based on optical principles. The image receiver 110 receives a detection image of a display panel to be detected from the image acquisition device, for example, from the AOI device.

In the embodiment of the present disclosure, the detecting the display panel to be detected includes identifying a classification of defect of the display panel to be detected and marking a position of the defect of the display panel to be detected. The classifications of defects include residue, missing, foreign matter, color, and the like, which is not particularly limited in the present disclosure.

In the detection device 100 of the embodiment of the present disclosure, a detection model for detecting the display panel is pre-constructed, and the detection image of the display panel to be detected is input into the detection model, so that the classification of the defect and the position of the defect of the display panel to be detected could be determined, thereby completing an automatic detection of the display panel to be detected.

In the embodiment of the present disclosure, the detection model is constructed through training based on a large number of detection images of different display panels. It should be noted that detection images of different display panels for training and constructing the detection model may be obtained from the same production line, or may be obtained from different production lines. When a detection model is trained and constructed based on detection images of different display panels obtained from the same production line, the detection device 100 provided by the embodiment of the present disclosure has higher detection accuracy on the display panels produced by the production line, and the detection device 100 could be used for improving the product quality of the specific production line; when the detection model is trained and constructed based on detection images of different display panels from different production lines, the detection device 100 provided by the embodiment of the present disclosure has higher detection accuracy on the display panels produced by the different production lines, thereby benefiting for mass production.

In the detection device of the display panel provided by the embodiment of the present disclosure, the detection model for detecting a defect of a display panel is pre-constructed, the detection model is trained and constructed based on a large number of detection images of different display panels, and the display panel could be automatically detected; in addition, when the display panel is detected by the detection device, the detection device could adapt to a constantly changing data distribution of a production line, and could have higher detection accuracy with respect to different production lines and different classifications of defects of display panels. In contrast to relying on the manual work to detect an image of a display panel acquired by an image acquisition device, the detection device of the display panel that the present disclosure embodiment provides could guarantee a high detection accuracy, and could also reduce the detection cost for a display panel and improve detection efficiency, which is benefit for promoting production quality and production efficiency of the display panel.

In the embodiment of the present disclosure, the detecting the display panel includes identifying a classification of the defect of the display panel and marking a position of the defect of the display panel.

Accordingly, in some embodiments, the detection model in embodiments of the present disclosure includes:

- a defect classification identification sub-model is configured to identify a classification of a defect of the display panel to be detected;
- a defect position identification sub-model is configured to mark a position of the defect of the display panel to be detected.

It should be noted that, in the embodiment of the present disclosure, the defect classification identification sub-model and the defect position identification sub-model may be combined arbitrarily, for example, the classification of the defect of the display panel may be identified first, and then the position of the defect of the display panel is marked; alternatively, the position of the defect of the display panel may be marked first, and then the classification of the defect of the display panel is identified; and alternatively, the classification of the defect of the display panel may be identified and the position of the defect of the display panel may be marked individually, which are then integrated together. This is not limited in the embodiment of the present disclosure.

In the embodiment of the present disclosure, an ensemble learning algorithm is used to construct the defect classification identification sub-model.

The ensemble learning means that a series of learners are learning to obtain a plurality of individual learners, and then the plurality of individual learners are integrated by combining strategies to obtain a strong learner. The basic concept is that under the condition that each individual learner has preference, that is, each individual learner only performs well in certain aspects, by integrating the individual learners, the generalization performance of the strong learner is improved while the accuracy of the strong learner is ensured.

In an actual production, forms of the defects of the display panel are various, and the data distributions of various forms of the defects are also changing. In the embodiment of the present disclosure, the defect classification identification sub-model is constructed according to the ensemble learning algorithm. Specifically, a plurality of individual learners are constructed according to a plurality of forms of defects and data distributions of the various defects, and then the plurality of individual learners are integrated to obtain the defect classification identification sub-model, so that the defect classification identification sub-model could adapt to the constantly changing data distribution of a production line, and could improve the detection accuracy of the defect of the display panel.

In an embodiment, the ensemble learning algorithm used in the embodiment of the present disclosure is a stacking algorithm.

The stacking algorithm comprising a structure of a two-layer learner is taken as an example. In the structure of the two-layer learner, a first layer includes a plurality of base models and a second layer includes a secondary model. The main concept of the stacking algorithm is to train the plurality of base models respectively, then combine prediction results output by the plurality of base models as a new data, and the new data is input to the secondary model, and a final classification result is given by the secondary model.

Accordingly, in some embodiments, the defect classification identifier sub-model includes a plurality of base models and a secondary model;

the plurality of base models are configured to determine an initial classification of a defect of the display panel to be detected; and the secondary model is configured to determine a final classification of the defect of the display panel to be detected according to input data obtained by integrating output data of the plurality of base models.

In the embodiment of the present disclosure, in the defect classification identification sub-model constructed according to the stacking algorithm, a plurality of base models may have different neural network structures, or may have the same neural network structure, which is not particularly limited in the present disclosure.

It should be noted that, in the embodiment of the present disclosure, when the plurality of base models have the same neural network structure, the plurality of base models are obtained by respectively training the same neural network by using data with different probability distributions. The different probability distributions correspond to data distributions of various forms of defects on the production line, and for example, includes a mean distribution, an exponential distribution, a bootstrap distribution, an original distribution, a binomial distribution, a gaussian distribution, and the like, which is not particularly limited by the present disclosure. The embodiment of the present disclosure respectively trains the same neural network structure by using data with different probability distributions, so that the constructed defect classification identification sub-model could adapt to the constantly changing data distribution of defects of the display panel of a production line, and meanwhile, a plurality of base models have the same neural network structure, thereby benefiting for selection of a neural network structure with an optimal performance, and facilitating subsequent optimization and debugging, and further improving the detection accuracy of the defect classification identification sub-model.

Accordingly, in some embodiments, the base model is a Convolutional Neural Network model, and different base models are obtained by respectively training the Convolutional Neural Network model with a plurality of first training data sets satisfying different probability distributions.

In some embodiments, the plurality of first training data sets include sample sets obtained by respectively sampling an original data set according to different predetermined sampling ratios, the different predetermined sampling ratios are sampling ratios of detection images of different classifications of defects determined according to different probability distributions, and the original data set includes a plurality of detection images of different display panels with known defects.

The average distribution, the exponential distribution, the bootstrap distribution, and the original distribution are taken as examples to further illustrate how to obtain the plurality of first training data set.

For the average distribution, a same number of detection images with different defect classifications are taken from the original data set and used as the plurality of first training data sets. That is, the ratios of the detection images with different defect classifications in the first training data sets are identical.

For the exponential distribution, a ratio of the detection images with each defect classification in the original data set is calculated and obtained, an evolution operation is performed on the ratio of the detection image with each defect classification in the original data set to obtain a new ratio, then for each defect classification, a corresponding number of detection images are taken from the original data set according to the new ratio, and the taken detection images of all defect classifications are taken as the plurality of first training data sets.

For the bootstrap distribution, a preset number of detection images are taken from the original data set as the first training data set by sampling with replacement.

For the original distribution, the original data set is taken as the first training data set.

It should be noted that, as an alternative example, in the embodiment of the present disclosure, for the average distribution, the exponential distribution, and the bootstrap distribution, after the sampling is finished, the remaining detection images are used as a verification set; and for the original distribution, the original data set is divided into the training data sets and the verification set in a ratio of 9:1.

It should be noted that, as an alternative embodiment, before a data processing unit 131 obtains the plurality of first training data sets by sampling, the data processing unit 131 is further configured to divide the original data set. For example, the original data set is divided into three parts according to a preset ratio, namely training data, verification data and test data. And the verification data is used for the secondary model, and the test data is used for evaluating the final result. In the embodiment of the present disclosure, the ratio among the training data, the verification data, and the test data is not particularly limited. For example, the ratio among the training data, the verification data, and the test data is 8:1:1. It should be noted that, after the original data set is divided, the data processing unit 131 generates the plurality of first training data sets by sampling the training data obtained by the division.

In the embodiment of the present disclosure, the Convolutional Neural Network model is not particularly limited. For example, the Convolutional Neural Network model may be any one of a Deep Residual Network (ResNet), a Dense Connected Convolutional Network (Densnet), and a VGG network. The inventor of the present disclosure finds that the VGG model has better performance relative to other Convolutional Neural Network models when constructing the defect classification identification sub-model.

The VGG model is a Convolutional Neural Network, and the VGG16 model is a VGG model with a 16-layer network structure. Typically, the VGG16 standard model has 13 convolutional layers and 3 fully-connected layers. The conventional convolutional layers described in the embodiments of the present disclosure refer to the original 13 convolutional layers in the VGG16 standard model. In the embodiment of the present disclosure, the VGG16 model is improved, and a batch normalization (BN) layer is added before a fully-connected layer of the VGG16 model; in the VGG16 standard model, the size of the input image is 224×224, and in the embodiment of the present disclosure, in order to process an image with the size of 600×600, after the last conventional convolutional layer of the VGG16 model, a supplementary convolution layer is added, such that the output of the supplementary convolution layer satisfies the input dimension of the fully-connected layer of the VGG16 standard model; a random discard layer is added, the random discard layer is a dropout layer, which is used for temporarily discarding a part of neural network units from the network according to a certain probability in the training process of the deep learning network, so that the occurrence of overfitting is effectively relieved.

Accordingly, in some embodiments, the Convolutional Neural Network model comprises a VGG16 model, the VGG16 model including:
- a batch normalization layer configured to normalize data to be input into the fully-connected layer of the VGG16 model;
- a supplementary convolution layer configured to convolve the data to be input into the fully-connected layer of the VGG16 model such that the data convolved by the supplementary convolution layer meets the input dimension of the fully-connected layer of the VGG16 model; and
- a random discard layer configured to randomly discard a part of neural network units in the VGG16 model to avoid overfitting.

Figure 2:
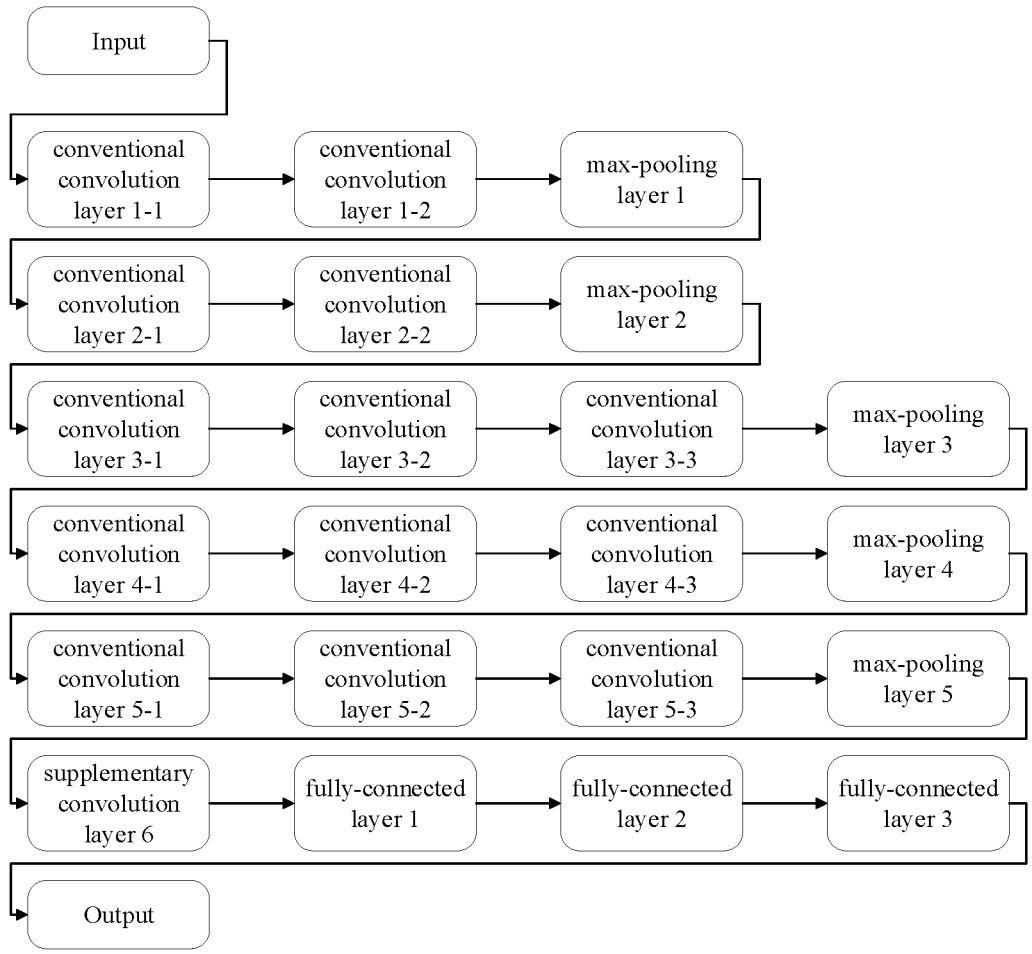
FIG. 2 is a structural schematic diagram of an alternative implementation of a VGG16 model according to an embodiment of the present disclosure.

FIG. 2 is a structural schematic diagram of a VGG16 model according to an embodiment of the present disclosure. As shown in FIG. 2, in the improved VGG16 model of the present disclosure, thirteen conventional convolutional layers, one supplemental convolutional layer, and three fully-connected layers are included.

In FIG. 2, the flow for processing the input detection image is as follows:
(1) After twice convolution by a conventional convolution layer 1-1 and a conventional convolution layer 1-2, performing max-pooling by a max-pooling layer 1, to take a point with a largest value in a local acceptance domain;
(2) After twice convolution by a conventional convolution layer 2-1 and a conventional convolution layer 2-2, performing max-pooling by a max-pooling layer 2;
(3) After three times convolution by a conventional convolution layer 3-1, a conventional convolution layer 3-2 and a conventional convolution layer 3-3, performing max-pooling by a max-pooling layer 3;
(4) After three times convolution by a conventional convolution layer 4-1, a conventional convolution layer 4-2 and a conventional convolution layer 4-3, performing max-pooling by a max-pooling layer 4;
(5) After three times convolution by a conventional convolution layer 5-1, a conventional convolution layer 5-2 and a conventional convolution layer 5-3, performing max-pooling by a max-pooling layer 5;
(6) After convolution by the supplementary convolution layer 6, passing through a fully-connected layer 1, a fully-connected layer 2 and a fully-connected layer 3 to obtain an output.

In addition, in the embodiment of the present disclosure, when training the VGG16 model, the fully-connected layer of the VGG16 model is initialized by a glorot algorithm, and regularized by an L2 regularization algorithm, so as to prevent overfitting. It should be noted that the glorot algorithm is Glorot Algorithm. In the supplementary convolution layer, initialization is also performed by the glorot algorithm.

Accordingly, in some embodiments, when training the Convolutional Neural Network model, the fully-connected layer is initialized by a first algorithm, the fully-connected layer is regularized by a second algorithm, and the supplementary convolution layer is initialized by a third algorithm.

In some embodiments, the first algorithm is a glorot algorithm, the second algorithm is an L2 regularization algorithm, and the third algorithm is a glorot algorithm.

It should be noted that, regularization is to control the complexity of the model by constraining, adjusting or reducing the coefficient estimate towards zero to avoid overfitting. According to a penalty item in the regularization algorithm, the regularization method includes L1 regularization and L2 regularization.

As an alternative implementation, in the embodiment of the present disclosure, after the last conventional convolutional layer, the improved VGG16 model further includes the following layers:
supplementary convolution layer (initialized by glorot)→BN layer→flatten layer→dropout layer→fully-connected layer (initialized by glorot+regularized by L2 regularization)→BN layer→dropout layer→fully-connected layer (initialized by glorot+regularized by L2 regularization)→BN layer→fully-connected layer (initialized by glorot+regularized by L2 regularization) (softmax).

In some embodiments, the secondary model is a classifier.

The classifier is not particularly limited in the embodiments of the present disclosure. For example, the classifier may be a Support Vector Machine (SVM) or a multi-class logistic regression classifier.

In some embodiments, the classifier is a neural network including a plurality of fully-connected layers and a normalized exponential function layer.

The normalized exponential function is softmax. Softmax is a logistic regression model that can map inputs to real numbers between 0-1, and the output real numbers between 0-1 represent the probability that each classification is taken. In the embodiment of the present disclosure, softmax may be used as a parameter of a fully-connected layer, or may be used as a single layer after the fully-connected layer, which is not particularly limited in the embodiment of the present disclosure.

In some embodiments, the classifier includes 2 fully-connected layers and a normalized exponential function layer.

It should be noted that, an output result of the classifier is a vector of n×1 dimension, where n is the number of classifications of the defects of the display panel. In the vector of n×1 dimension, each element is a real number between 0 and 1, each element corresponds to a defect classification of the display panel, and the value of each element represents a probability that the current defect classification of the display panel is a defect classification corresponding to the element. Accordingly, when the detection device 100 detects a display panel to be detected, the classification of the defect corresponding to the element with a largest value in the vector of n×1 dimension output by the detection model pre-constructed in the detection device 100 is determined as the classification of the defect of the display panel currently being detected.

As described above, in the embodiment of the present disclosure, the secondary model determines a final classification of the defect of the display panel to be detected according to the input data obtained by integrating the output data of the base models. The embodiment of the present disclosure does not particularly limit how the output data of the plurality of base models are integrated to obtain the input data. As an alternative embodiment, the output vectors of the base models are connected to generate a new vector as the input data. For example, assuming that the defect classification identification sub-model includes 4 base models, the 4 base models respectively correspond to 4 probability distributions, output from the second-to-last layer of each base model (i.e. the output from the second fully-connected layer), which is usually a vector of m×1 dimension, is taken, four vectors of m×1 dimension are connected to obtain a vector of 4m×1 dimension, and the vector of 4m×1 dimension is used as the input data of the secondary model.

In some embodiments, the data integrated from the output data of the plurality of base models is stored in an hdf5 format.

In some embodiments, the defect position identification sub-model is an object detector.

In some embodiments, the object detector includes a retinal mesh object detection model.

Figure 3:
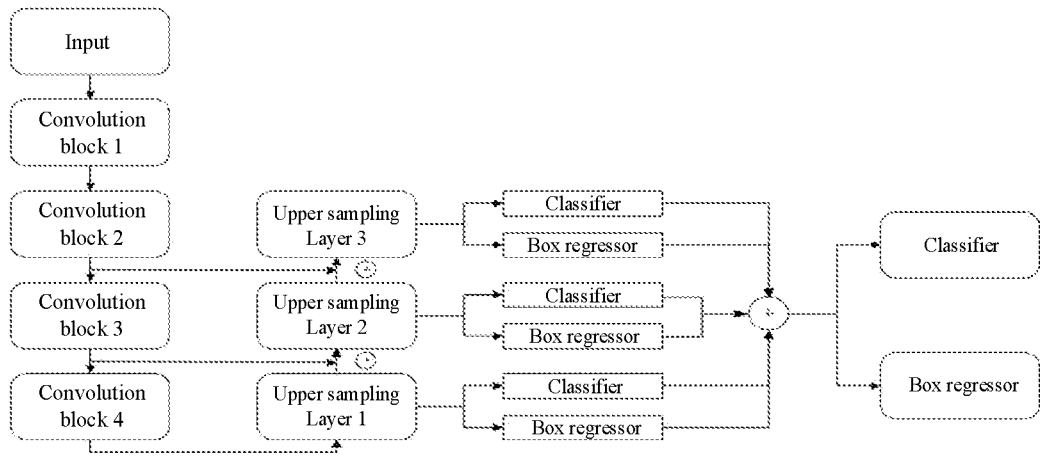
FIG. 3 is a structural schematic diagram of a retinal mesh object detection model according to an embodiment of the present disclosure.

The retinal mesh object detection model is a RetinaNet model. FIG. 3 shows a network structure of the RetinaNet model. The RetinaNet model marks the position and the classification of the defect of the display panel in the output.

It should be noted that, in the embodiment of the present disclosure, when training the RetinaNet model, detection images with defect classifications such as a normal image, a black image, and a fuzzy image in an original data set are removed, and in addition, all the classifications of the defects are classified into one classification, which is called a foreground, so that the RetinaNet model only distinguishes the foreground and the background during training, and so that the RetinaNet model focuses on marking the position of the defect, and does not need to distinguish the classifications of the defects.

Figure 4:
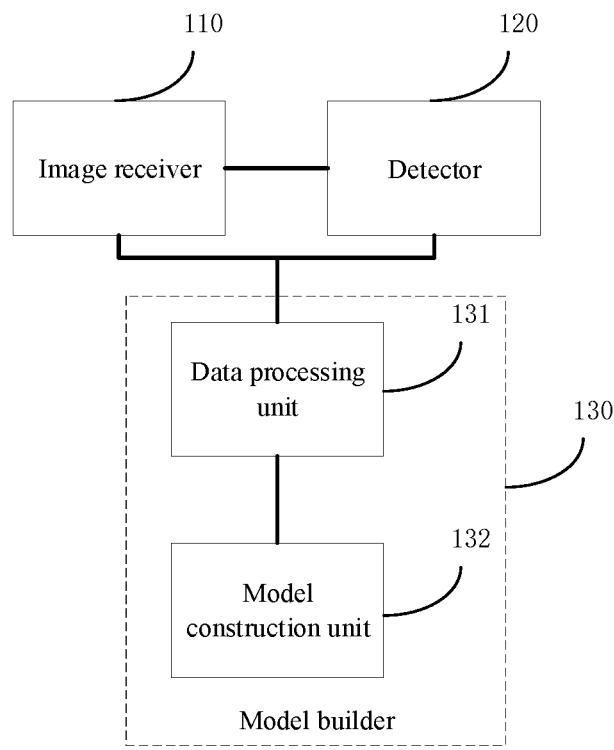
FIG. 4 is a block diagram of a detection device of a display panel according to an embodiment of the present disclosure.

In some embodiments, referring to FIG. 4, the detection device 100 further includes a model builder 130, the model builder 130 including:
    a data processing unit 131 configured to acquire an original data set including a plurality of detection images of different display panels with known defects; and
    a model construction unit 132 configured to construct the detection model according to the original data set.

As described above, the detection images of different display panels in the original data set may be obtained from the same production line, or may be obtained from different production lines. It should be noted that, in order to train the detection model, in the embodiment of the present disclosure, the defect of the display panel in the detection image constituting the original data set is identified and marked in advance, and the content of the mark includes the position and the classification of the defect of the display panel.

It can be understood that the greater the number of detection images contained in the original data set, the higher the detection accuracy when the detection model constructed from the original data set is used for detecting a display panel; the higher the randomness of the process of acquiring the detection image constituting the original data set is, the higher the detection accuracy of the detection model is when the detection model is used for detecting a display panel; the more classifications of the defects of the display panel are included in the detection images constituting the original data set, the higher the detection accuracy of the detection model is when the detection model is used for detecting a display panel.

The process of the model builder 130 constructing the detection model in the embodiment of the present disclosure is explained below.

When constructing the defect classification identification sub-model, the process of training the Convolutional Neural Network to obtain a plurality of base models is as below.

The data processing unit 131 is configured to determine sampling ratios of the detection images of different classifications of the defects respectively corresponding to each of the plurality of probability distributions.

The data processing unit 131 is further configured to sample the original data set according to sampling ratios of the detection images of different classifications of the defects, so as to obtain a plurality of first training data sets with different probability distributions.

The model constructing unit 132 is configured to train the Convolutional Neural Network model with the plurality of first training data sets, and generate a plurality of base models respectively corresponding to different probability distributions.

In the embodiment of the present disclosure, before the model building unit 132 trains the Convolutional Neural Network model, the data processing unit 131 pre-processes the detection images in the first training data set to further improve the training rate of the model, which specifically includes the following steps:
    standardizing the detection images in the plurality of first training data sets according to a difference algorithm; and
    normalizing the standardized detection images.

It should be pointed out that, the standardization processing is to further standardize size, format, and the like of the detection images in the first training data set, for example, to scale the detection images to 600×600; the normalization processing is to perform a dimensionless processing on the detection images in the first training data set to reduce magnitude and increase reading rate of the detection images, for example, to subtract a pixel mean value of the detection image from a pixel value of each pixel in the detection image to normalize the pixel value of the detection image.

In the embodiment of the present disclosure, the difference algorithm is not particularly limited, and for example, the difference algorithm may be any one of a nearest neighbor difference algorithm, a bilinear difference algorithm, a bicubic difference algorithm, and a Lanxos (LANCZOS) difference algorithm. The inventor finds that the bicubic difference algorithm and the LANCZOS algorithm have better performance for image scaling compared with other difference algorithms, and the LANCZOS algorithm has a faster running speed.

It should be noted that, as an alternative embodiment, the detection image pre-processed by the data processing unit 131 is stored in an hdf5 format, so as to further increase the reading rate.

In the embodiment of the present disclosure, the model constructing unit 132 further performs optimization using an optimization algorithm to accelerate a convergence rate of training the Convolutional Neural Network model.

It should be noted that, in the embodiment of the present disclosure, the optimization algorithm is not particularly limited, and for example, the optimization algorithm may be a Stochastic Gradient Descent (SGD) algorithm, an Adaptive Learning Rate adjustment (Adadelta) algorithm, or an Adaptive moment estimation (Adam) algorithm. The inventor of the present disclosure researches to find that the SGD algorithm has better performance.

As an alternative embodiment, when the SGD algorithm is used for optimization, the learning rate is set to 0.001, and the convergence rate of the model is increased by a momentum gradient descent (momentum) algorithm and a nesrieov (neterov) gradient acceleration algorithm.

When constructing the defect classification identification sub-model, the process of training the classifier to obtain the secondary model includes the following two steps.

The data processing unit 131 is configured to integrate output data of a plurality of base models in a process of obtaining the plurality of base models by training the Convolutional Neural Network model, so as to generate a second training set.

The model constructing unit 132 is configured to train the classifier according to the second training set, so as to obtain the secondary model.

The process of constructing the defect position identification sub-model includes the following step.

The model constructing unit 132 is configured to train the object detection model according to the original data set, so as to obtain the defect position identification sub-model.

Figures 5, 6:
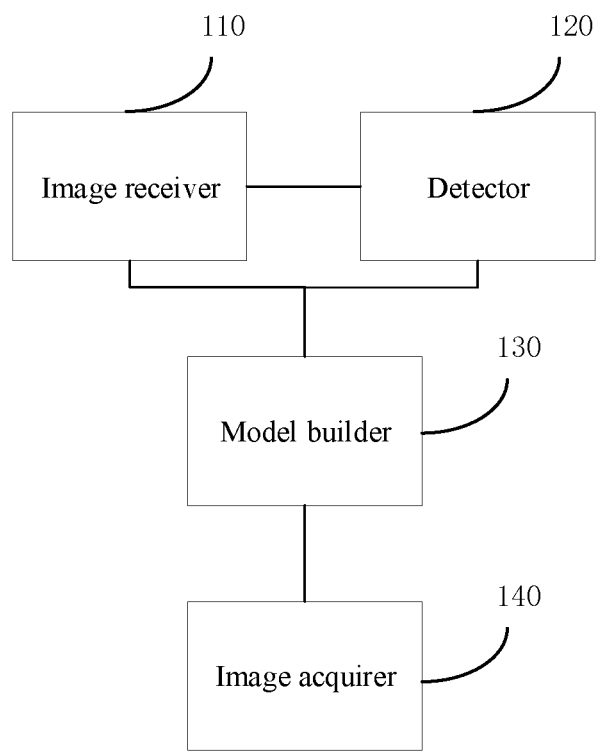
FIG. 5 is a block diagram of a detection device of a display panel according to an embodiment of the present disclosure.
FIG. 6 is a flowchart of a detection method of a display panel according to an embodiment of the present disclosure.

In some embodiments, referring to FIG. 5, the detection device 100 further includes:

an image acquirer 140 for acquiring a detection image of the display panel.

In the embodiment of the present disclosure, the image acquirer 140 may be an image acquisition device, such as an AOI device, that is, the image acquisition device may be a part of the detection device 100 provided in the embodiment of the present disclosure. Accordingly, the image receiver 110 receives the detection image acquired from the image acquirer 140.

It should be further noted that the model builder 130 is configured to construct detection images of different display panels with known defects of the detection model, and the detection images could alternatively be acquired by the image acquirer 140.

In a second aspect, referring to FIG. 6, a detection method of a display panel is provided, including a step S100: inputting a detection image of a display panel to be detected into a detection model and detecting the display panel to be detected, the detection model being pre-constructed and configured to detect the display panel.

The detection model includes a defect classification identification sub-model configured to identify a classification of a defect of the display panel to be detected; and a defect position identification sub-model configured to mark a position of the defect of the display panel to be detected; the defect classification identification sub-model includes a plurality of base models and a secondary model; the plurality of base models are configured to respectively determine an initial classification of the defect of the display panel to be detected; and the secondary model is configured to determine a final classification of the defect of the display panel to be detected according to the input data obtained by integrating the output data of the plurality of base models.

In the embodiment of the disclosure, a detection model for detecting the display panel is pre-constructed through training based on a large number of detection images of different display panels, and when the display panel is detected, the detection image of the display panel to be detected is input into the pre-constructed detection model, so that a detection result could be obtained, and an automatic detection of the display panel is realized.

In the embodiment of the present disclosure, a detection image of a display panel to be detected includes a picture acquired by photographing a display panel with an image acquisition device. For example, the display panel is photographed with an AOI device to acquire an AOI detection image. The AOI device is equipment for detecting a display panel by scanning the display panel and acquiring images based on optical principles.

In the embodiment of the present disclosure, the detecting the display panel to be detected includes identifying a classification of a defect of the display panel to be detected and marking a position of the defect of the display panel to be detected. The classifications of the defect include residue, missing, foreign matter, color, and the like, which is not particularly limited in the present disclosure.

In the detection method for the display panel provided by the embodiment of the present disclosure, the display panel is automatically detected by using the pre-constructed detection model, so that the method could adapt to a constantly changing data distribution of a production line, and could have a higher detection accuracy with respect to the defects of different production lines and different classifications of display panels. Compared with the method relying on the manual work to detect an image of a display panel acquired by an image acquisition device, the detection method of the display panel that the present disclosure embodiment provided could guarantee the detection accuracy, and at the meanwhile, could reduce the cost of detection of a display panel and improve detection efficiency, which is benefit for promoting the production quality and production efficiency of the display panel.

In the embodiment of the present disclosure, the detecting the display panel includes identifying a classification of the defect of the display panel and marking a position of the defect of the display panel.

Accordingly, in some embodiments, the detection model includes a defect classification identification sub-model and a defect position identification sub-model.

As described above, in the embodiments of the present disclosure, an ensemble learning algorithm is used to construct the defect classification identification sub-model.

In some embodiments, a plurality of base models are based on the same Convolutional Neural Network model, and different base models are obtained by respectively training the Convolutional Neural Network model with a plurality of first training data sets satisfying different probability distributions.

Figure 7:
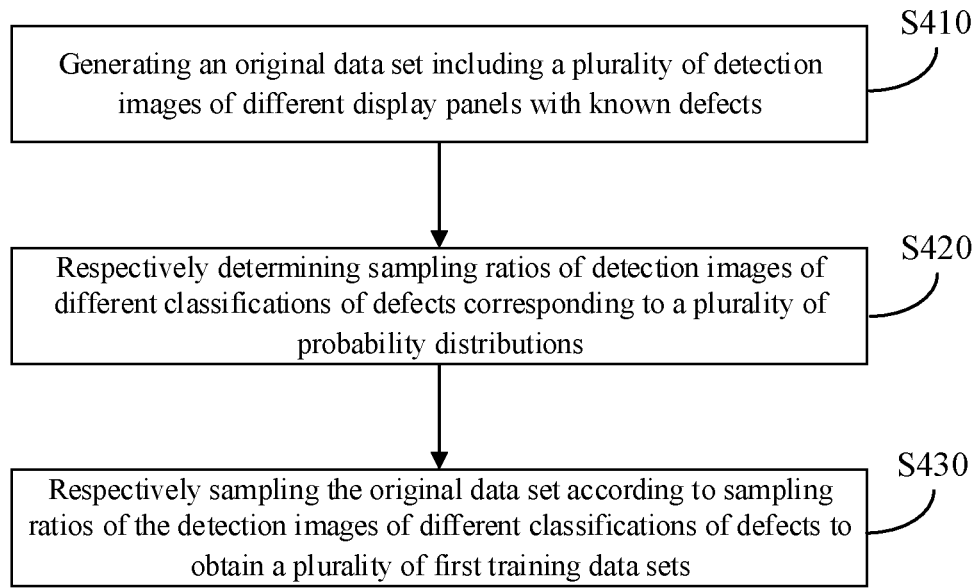
FIG. 7 is a flowchart of a part of steps in a detection method of a display panel according to an embodiment of the present disclosure.

Referring to FIG. 7, in some embodiments, the step of generating a plurality of first training data sets includes steps S410 to S430:

in step S410, generating an original data set including a plurality of detection images of different display panels with known defects;

in step S420, respectively determining sampling ratios of detection images of different classifications of defects corresponding to a plurality of probability distributions; and in step S430, respectively sampling the original data set according to the sampling ratios of the detection images of different classifications of defects to obtain a plurality of first training data sets.

In the embodiment of the present disclosure, the Convolutional Neural Network model is not particularly limited. For example, the Convolutional Neural Network model may be any one of a Deep Residual Network (ResNet), a Dense Connected Convolutional Network (Densnet), and a VGG network. The inventor of the present disclosure finds that the VGG model has better performance compared with other Convolutional Neural Network models when constructing the defect classification identification sub-model.

As an alternative implementation, the embodiments of the present disclosure use the VGG16 model to construct the base model.

Typically, the VGG16 standard model has 13 convolutional layers and 3 fully-connected layers. The conventional convolutional layers described in the embodiments of the present disclosure refer to the original 13 convolutional layers in the VGG16 standard model. In the embodiment of the present disclosure, the VGG16 model is improved, and a Batch Normalization (BN) layer is added before a fully-connected layer of the VGG16 model; in the VGG16 standard model, the size of the input image is 224×224, in the embodiment of the present disclosure, in order to process an image with the size of 600×600, after the last conventional convolutional layer of the VGG16 model, a supplementary convolution layer is added, so that the output of the supplementary convolution layer satisfies the input dimension of the fully-connected layer of the VGG16 standard model; a random discard layer is added, the random discard layer is a dropout layer, which is used for temporarily discarding a part of neural network units from the network according to a certain probability in the training process of the deep learning network, so that the occurrence of overfitting is effectively relieved. In addition, in the embodiment of the present disclosure, when training the VGG16 model, the fully-connected layer of the VGG16 model is initialized by a glorot algorithm, and is regularized by an L2 regularization algorithm, so as to prevent overfitting. It should be noted that the glorot algorithm is a Glorot algorithm. In the supplementary convolution layer, initialization is also performed by the glorot algorithm.

Accordingly, in some embodiments, the Convolutional Neural Network model includes a fully-connected layer, a supplementary convolution layer, a batch normalization layer, and a random discard layer.

The supplementary convolution layer is configured to convolve data to be input into the fully-connected layer so that the data convolved by the supplementary convolution layer meets the input dimension of the fully-connected layer.

The batch normalization layer is configured to normalize data to be input into the fully-connected layer.

The random discard layer is configured to randomly discard a part of neural network units of the Convolutional Neural Network model to avoid overfitting.

When training the Convolutional Neural Network model, the fully-connected layer is initialized by a first algorithm, the fully-connected layer is regularized by a second algorithm, and the supplementary convolution layer is initialized by a third algorithm.

In some embodiments, the first algorithm is a glorot algorithm, the second algorithm is an L2 regularization algorithm, and the third algorithm is a glorot algorithm.

In some embodiments, the secondary model is a classifier.

The classifier is not particularly limited in the embodiments of the present disclosure. For example, the classifier may be a Support Vector Machine (SVM) or a multi-class logistic regression classifier.

In some embodiments, the classifier is a neural network including a plurality of fully-connected layers and a normalized exponential function layer.

The normalized exponential function is softmax. Softmax is a logistic regression model that can map inputs to real numbers between 0-1, and the output real numbers between 0-1 represent the probability that each classification is taken. In the embodiment of the present disclosure, softmax may be used as a parameter of a fully-connected layer, or may be used as a single layer behind the fully-connected layer, which is not particularly limited in the embodiment of the present disclosure.

In some embodiments, the classifier includes 2 fully-connected layers and a normalized exponential function layer.

It should be noted that, an output result of the classifier is a vector of n×1 dimension, where n is the number of classifications of the defect of the display panel. In the vector of n×1 dimension, each element is a real number between 0 and 1, each element corresponds to the classification of the defect of the display panel, and the value of each element represents a probability that the classification of the defect of the current display panel is a classification of the defect corresponding to the element. Accordingly, when the display panel to be detected is detected, the classification of the defect corresponding to the element with a largest value in the vector of n×1 dimension output by the detection model is determined as the classification of defect of the display panel currently being detected.

In some embodiments, the defect position identification sub-model is an object detector.

In some embodiments, the object detector includes a retinal mesh object detection model.

The retinal mesh object detection model is a RetinaNet model. FIG. 3 shows a network structure of the RetinaNet model. The RetinaNet model marks the position and the classification of the defect of the display panel in the output.

It should be noted that, in the embodiment of the present disclosure, when training the RetinaNet model, detection images with defect classifications such as a normal image, a black image, and a fuzzy image in an original data set are removed, and in addition, all the classifications of the defects are classified into one classification, which is called a foreground, so that the RetinaNet model only distinguishes the foreground and the background during training, and so that the RetinaNet model focuses on marking the position of the defect, and do not need to distinguish the classifications of the defects.

Figure 8:
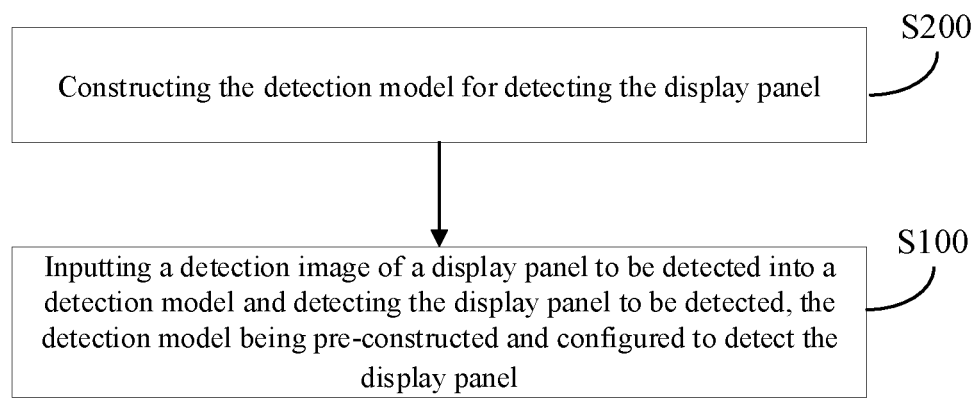
FIG. 8 is a flowchart of a part of steps in a detection method of a display panel according to an embodiment of the present disclosure.

In some embodiments, referring to FIG. 8, before step S100, the detection method provided in the embodiments of the present disclosure further includes step S200: constructing the detection model for detecting the display panel.

Figure 9:
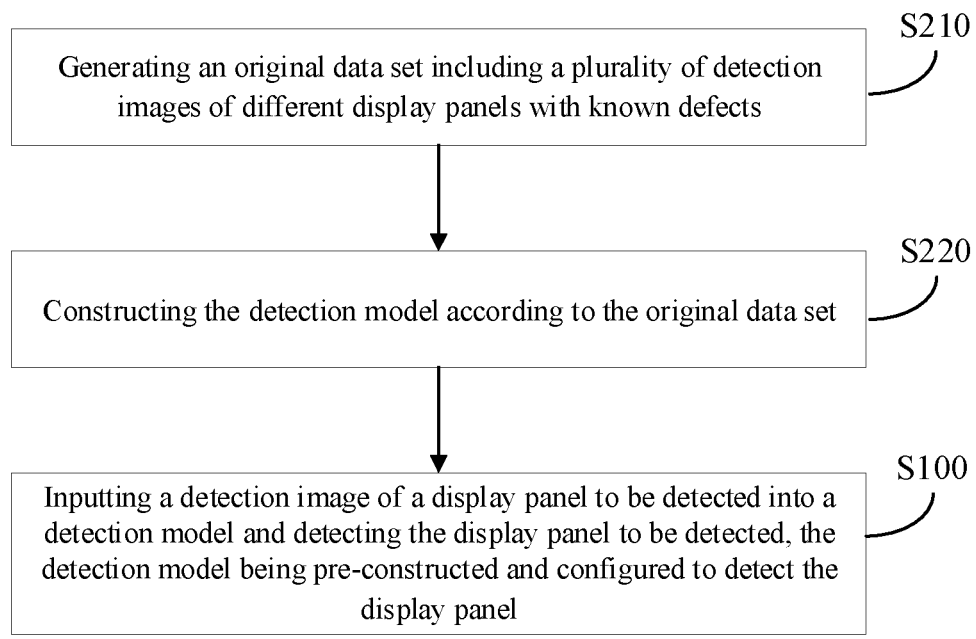
FIG. 9 is a flowchart of a part of steps in a detection method of a display panel according to an embodiment of the present disclosure.

In some embodiments, referring to FIG. 9, step S200 includes:
  in step S210, generating an original data set including a plurality of detection images of different display panels with known defects; and
  in step S220, constructing the detection model according to the original data set.

Figure 10:
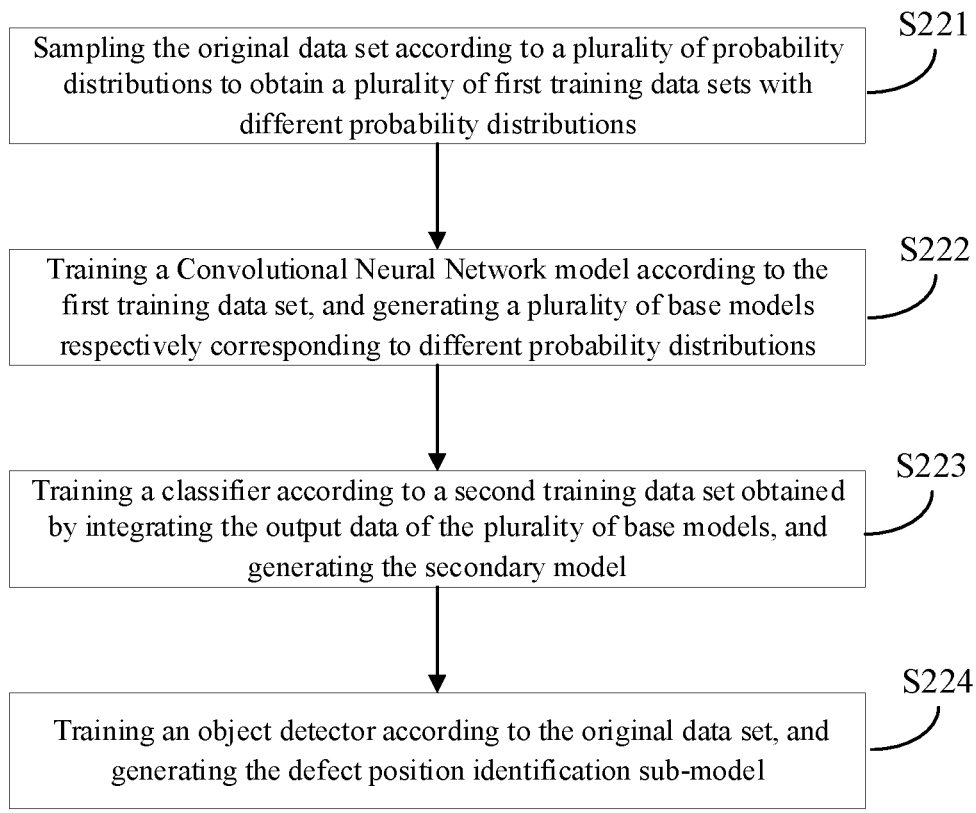
FIG. 10 is a flowchart of a part of steps in a detection method of a display panel according to an embodiment of the present disclosure.

In some embodiments, referring to FIG. 10, step S220 includes:
  in step S221, sampling the original data set according to a plurality of probability distributions to obtain a plurality of first training data sets with different probability distributions;
  in step S222, training a Convolutional Neural Network model according to the first training data set, and generating a plurality of base models respectively corresponding to different probability distributions;

in step S223, training a classifier according to a second training data set obtained by integrating output data of the plurality of base models, and generating the secondary model;

in step S224, training an object detector according to the original data set, and generating the defect position identification sub-model.

The embodiment of the present disclosure does not particularly limit how the output data of the plurality of base models are integrated to obtain the input data. In an embodiment, the output vectors of the base models are concatenated to generate a new vector as the input data. For example, assuming that the defect classification identification sub-model includes 4 base models, the 4 base models respectively correspond to 4 probability distributions, output from the second-to-last layer of each base model (i.e. the output from the second fully-connected layer), which is usually a vector of m×1 dimension is taken, 4 vectors of m×1 dimension are connected to obtain a vector of 4m×1 dimension, and the vector of 4m×1 dimension is used as the input data of the secondary model.

A process of constructing the detection model in the embodiment of the present disclosure is explained below.

When the defect classification identification sub-model is constructed, the process of training the Convolutional Neural Network to obtain a plurality of base models includes the following steps:

determining sampling ratios of the detection images of different classifications of defects respectively corresponding to the plurality of probability distributions;

sampling the original data set according to sampling ratios of the detection images of different classifications of defects, so as to obtain a plurality of first training data sets with different probability distributions; and training the Convolutional Neural Network model with the plurality of first training data sets, and generate the plurality of base models respectively corresponding to different probability distributions.

It should be noted that, in an embodiment of the present disclosure, for the average distribution, the exponential distribution, and the bootstrap distribution, after the sampling is finished, the remaining detection images are used as a verification set; for the original distribution, the original data set is divided into training data sets and verification set in a ratio of 9:1.

It should be noted that, as an alternative embodiment, before obtaining a plurality of first training data sets by sampling, the original data set is further divided. For example, the original data set is divided into three parts according to a preset ratio, namely training data, verification data and test data. And the verification data is used for the secondary model, and the test data is used for evaluating the final result. In the embodiment of the present disclosure, the ratio among the training data, the verification data and the test data is not particularly limited. For example, the ratio among the training data, the verification data and the test data is 8:1:1. It should be noted that, after dividing the original data set, a plurality of first training data sets are generated by sampling the training data obtained by dividing the original data set.

In the embodiment of the present disclosure, before training the Convolutional Neural Network model, the detection images in the first training data set is pre-processed to further improve the training rate of the model. The process of the pre-processing specifically includes the following steps:

standardizing the detection images in the plurality of first training data sets according to a difference algorithm; and normalizating the standardized detection images.

The standardization processing is to further standardize size, format, and the like of the detection images in the first training data sets, for example, to scale the detection images to 600×600; the normalization processing is to perform dimensionless processing on the detection image in the first training data set to reduce magnitude and increase the reading rate of the detection images, for example, to subtract a pixel mean value of the detection images from each pixel in the detection images to normalize the pixel values of the detection images.

In the embodiment of the present disclosure, the difference algorithm is not particularly limited, and for example, the difference algorithm may be any one of a nearest neighbor difference algorithm, a bilinear difference algorithm, a bicubic difference algorithm, and a Lanxos (LANCZOS) difference algorithm. The inventor researches and finds that the bicubic difference algorithm and the LANCZOS algorithm have better performance in the image scaling compared with other difference algorithms, and the LANCZOS algorithm has a faster running speed.

It should be noted that, as an alternative embodiment, the pre-processed detection images are stored in an hdf5 format, so as to further increase the reading rate.

In the embodiment of the present disclosure, an optimization algorithm is performed to accelerate a convergence rate of training the Convolutional Neural Network model.

It should be noted that, in the embodiment of the present disclosure, the optimization algorithm is not particularly limited, and for example, the optimization algorithm may be a Stochastic Gradient Descent (SGD) algorithm, an Adaptive Learning Rate adjustment (Adadelta) algorithm, or an Adaptive moment estimation (Adam) algorithm. The inventor of the present disclosure finds that the SGD algorithm has better performance.

As an alternative embodiment, when the SGD algorithm is used for optimization, the learning rate is set to 0.001, and the convergence rate of the model is increased by a momentum gradient descent (momentum) algorithm and a nesrieov (neterov) gradient acceleration algorithm.

When constructing the defect classification identification sub-model, the process of training the classifier to obtain the secondary model includes:

integrating output data of a plurality of base models in a process of obtaining the plurality of base models by training the Convolutional Neural Network model, so as to generate a second training set; and training the classifier according to the second training set, so as to obtain the secondary model.

The process of constructing the defect position identification sub-model includes:

training the object detection model according to the original data set, so as to obtain the defect position identification sub-model.

Figure 11:
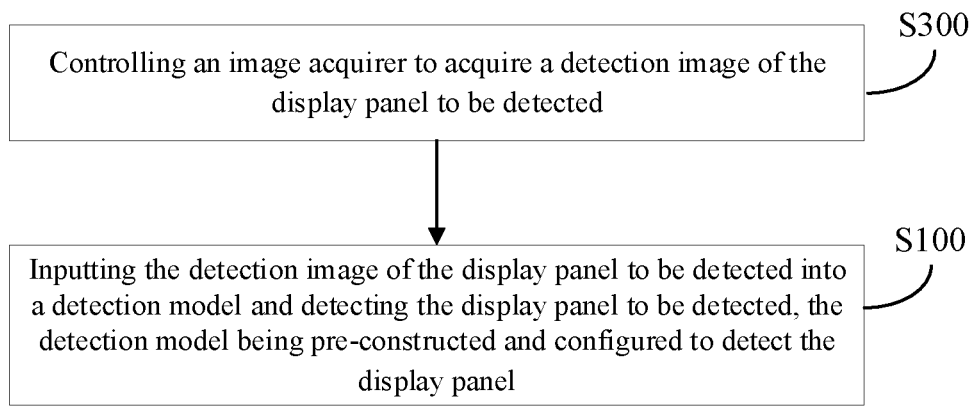
FIG. 11 is a flowchart of a part of steps in a detection method of a display panel according to an embodiment of the present disclosure.

In some embodiments, referring to FIG. 11, the detection method further includes:

in step S300, the image acquirer is controlled to acquire a detection image of the display panel to be detected.

Figure 12:
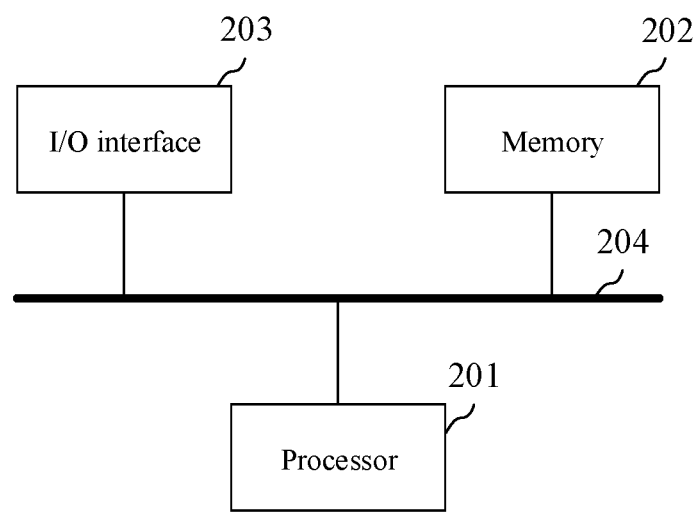
FIG. 12 is a block diagram of an electronic device according to an embodiment of the present disclosure.

In a third aspect, referring to FIG. 12, an embodiment of the present disclosure provides an electronic device, including:

one or more processors 201;

a memory 202, one or more programs stored thereon, when the one or more programs executed by the one or more processors, the one or more processors were caused to perform any one of the above detection methods of a display panel;

one or more I/O interfaces 203 connected between the one or more processors and the memory, and configured to enable information interaction between the one or more processors and the memory.

The processor 201 is a device with data processing capability, which includes, but not limited to, a Central Processing Unit (CPU) and the like; the memory 202 is a device having data storage capability including, but not limited to, a random access memory (RAM, more specifically SDRAM, DDR, etc.), a Read Only Memory (ROM), an Electrically Erasable Programmable Read Only Memory (EEPROM), a FLASH memory (FLASH); the I/O interface (read/write interface) 203 is connected between the processor 201 and the memory 202, and can implement information interaction between the processor 201 and the memory 202, and includes, but not limited to, a data Bus (Bus) and the like.

In some embodiments, the processor 201, the memory 202, and the I/O interface 203 are interconnected among them by a bus 204, and are in turn connected with other components of the computing device.

The above description has been made in detail on the detection method of the display panel, and details are not repeated herein.

Figure 13:
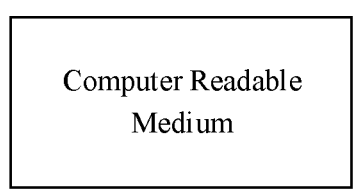
FIG. 13 is a block diagram of a computer-readable medium according to an embodiment of the present disclosure.

In a fourth aspect, with reference to FIG. 13, an embodiment of the present disclosure provides a computer-readable medium, a computer program stored thereon, when the computer program is executed by a processor, the processor is caused to perform any one of the above detection methods of a display panel.

The above description has been made in detail on the detection method of the display panel, and details are not repeated herein.

It will be understood by a person skilled in the art that, all or some of the steps of the methods, systems, functional modules/units in the devices disclosed above may be implemented as software, firmware, hardware, or suitable combinations thereof. In a hardware implementation, the division between functional modules/units mentioned in the above description does not necessarily correspond to the division of physical components; for example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable medium, which may include a computer storage medium (or non-transitory medium) and a communication medium (or transitory medium). The term computer storage medium includes volatile and nonvolatile, removable and non-removable medium implemented in any method or technology for storage of information such as computer readable instructions, data structures, program modules or other data, as is well known to a person skilled in the art. Computer storage medium includes, but is not limited to, RAM, ROM, EEPROM, flash memory or other memory, CD-ROM, Digital Versatile Disks (DVD) or other optical disk storage, magnetic cassettes, magnetic tape, magnetic disk storage or other magnetic storage devices, or any other medium which can be used to store the desired information and which can accessed by a computer. In addition, communication medium typically embodies computer readable instructions, data structures, program modules or other data in a modulated data signal such as a carrier wave or other transport mechanism and includes any information delivery medium as is well known to a person skilled in the art.

Exemplary embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to a person skilled in the art. It will, therefore, be understood by a person skilled in the art that, various changes in form and details may be made therein without departing from the scope of the disclosure as set forth in the appended claims.

What is claimed is:

1. A detection method, comprising:
   inputting an image to be detected into a detection model being pre-constructed and detecting the image to be detected;
   wherein the detection model comprises:
   a defect classification identification sub-model configured to identify a classification of a defect in the image to be detected; wherein the defect classification identification sub-model comprises a plurality of base models and a secondary model;
   the plurality of base models are configured to respectively determine an initial classification of the defect in the image to be detected; and
   the secondary model is configured to determine a final classification of the defect in the image to be detected according to input data obtained by integrating output data of the plurality of base models;
   wherein the detection model further comprises: a defect position identification sub-model configured to mark a position of the defect in the image to be detected;
   wherein the defect position identification sub-model is an object detector; and
   wherein the defect position identification sub-model is obtained by training the object detector based on an original data set;
   the training the object detector based on the original data set comprises:
   acquiring the original data set comprising a plurality of images to be detected with known defects; and
   classifying first regions corresponding to defects of all classifications of defects in the plurality of images to be detected with known defects into one classification as a foreground and classifying regions outside the first regions in the plurality of images to be detected with known defects into the other classification as a background such that the object detector only distinguishes between the foreground and the background when the object detector is trained, to identify only positions of the defects.

2. The detection method of claim 1, wherein the plurality of base models are obtained by respectively training a same Convolutional Neural Network model with a plurality of first training data sets satisfying different probability distributions.

3. The detection method of claim 2, further comprising generating the plurality of first training data sets, which comprises:

generating an original data set comprising a plurality of images to be detected with known defects;

respectively determining sampling ratios of images to be detected of different classifications of defects corresponding to a plurality of probability distributions; and respectively sampling the original data set according to the sampling ratios of the images to be detected of different classifications of defects to obtain the plurality of first training data sets.

4. The detection method of claim 2, wherein the Convolutional Neural Network model comprises a fully-connected layer, a supplementary convolution layer, a batch normalization layer and a random discard layer;

the supplementary convolution layer is configured to convolve data to be input into the fully-connected layer such that the data convolved by the supplementary convolution layer meets an input dimension of the fully-connected layer;

the batch normalization layer is configured to normalize the data to be input into the fully-connected layer;

the random discard layer is configured to randomly discard a part of neural network units of the Convolutional Neural Network model to avoid overfitting; and when the Convolutional Neural Network model is trained, the fully-connected layer is initialized with a first algorithm, the fully-connected layer is regularized with a second algorithm, and the supplementary convolution layer is initialized with a third algorithm.

5. The detection method of claim 1, wherein the secondary model is a classifier comprising a plurality of fully-connected layers and a normalized exponential function layer.

6. The detection method of claim 1, wherein before the classifying first regions corresponding to defects of all classifications of defects in the plurality of images to be detected with known defects into one classification as a foreground and classifying regions outside the first regions in the plurality of images to be detected with known defects into the other classification as a background, the training the object detector based on the original data set further comprises: removing an image to be detected with a classification of a normal image, a black image or a fuzzy image in the original data set.

7. An electronic device, comprising:

one or more processors;

a memory, storing one or more programs, which when executed by the one or more processors, cause the one or more processors to perform a detection method; and one or more I/O interfaces connected between the one or more processors and the memory and configured to exchange information between the one re more processors and the memory, wherein the detection method comprises:

inputting an image to be detected into a detection model being pre-constructed and detecting the image to be detected;

wherein the detection model comprises:

a defect classification identification sub-model configured to identify a classification of a defect in the image to be detected;

wherein the defect classification identification sub-model comprises a plurality of base models and a secondary model;

the plurality of base models are configured to respectively determine an initial classification of the defect in the image to be detected; and the secondary model is configured to determine a final classification of the defect in the image to be detected according to input data obtained by integrating output data of the plurality of base models;

wherein the detection model further comprises: a defect position identification sub-model configured to mark a position of the defect in the image to be detected;

wherein the defect position identification sub-model is an object detector; and wherein the defect position identification sub-model is obtained by training the object detector based on an original data set;

the training the object detector based on the original data set comprises:

acquiring the original data set comprising a plurality of images to be detected with known defects; and classifying first regions corresponding to defects of all classifications of defects in the plurality of images to be detected with known defects into one classification as a foreground and classifying regions outside the first regions in the plurality of images to be detected with known defects into the other classification as a background such that the object detector only distinguishes between the foreground and the background when the object detector is trained, to identify only positions of the defects.

8. The electronic device of claim 7, wherein the plurality of base models are obtained by respectively training a same Convolutional Neural Network model with a plurality of first training data sets satisfying different probability distributions.

9. The electronic device of claim 8, wherein comprising generating the plurality of first training data sets, which comprises:

generating an original data set comprising a plurality of images to be detected with known defects;

respectively determining sampling ratios of images to be detected of different classifications of defects corresponding to a plurality of probability distributions; and respectively sampling the original data set according to the sampling ratios of the images to be detected of different classifications of defects to obtain the plurality of first training data sets.

10. The electronic device of claim 8, wherein the Convolutional Neural Network model comprises a fully-connected layer, a supplementary convolution layer, a batch normalization layer and a random discard layer;

the supplementary convolution layer is configured to convolve data to be input into the fully-connected layer such that the data convolved by the supplementary convolution layer meets an input dimension of the fully-connected layer;

the batch normalization layer is configured to normalize the data to be input into the fully-connected layer;

the random discard layer is configured to randomly discard a part of neural network units of the Convolutional Neural Network model to avoid overfitting; and when the Convolutional Neural Network model is trained, the fully-connected layer is initialized with a first algorithm, the fully-connected layer is regularized with a second algorithm, and the supplementary convolution layer is initialized with a third algorithm.

11. The electronic device of claim 7, wherein the secondary model is a classifier comprising a plurality of fully-connected layers and a normalized exponential function layer.

12. The electronic device of claim 7, wherein before the classifying first regions corresponding to defects of all classifications of defects in the plurality of images to be detected with known defects into one classification as a foreground and classifying regions outside the first regions in the plurality of images to be detected with known defects into the other classification as a background, the training the object detector based on the original data set further comprises: removing an image to be detected with a classification of a normal image, a black image or a fuzzy image in the original data set.

13. A non-transitory computer-readable storage medium, storing a computer program, which when executed by a processor, causes the processor to perform a detection method, which comprises:
 inputting an image to be detected into a detection model being pre-constructed and detecting the image to be detected;
 wherein the detection model comprises:
 a defect classification identification sub-model configured to identify a classification of a defect in the image to be detected;
 wherein the defect classification identification sub-model comprises a plurality of base models and a secondary model;
 the plurality of base models are configured to respectively determine an initial classification of the defect in the image to be detected; and
 the secondary model is configured to determine a final classification of the defect in the image to be detected according to input data obtained by integrating output data of the plurality of base models;
 wherein the detection model further comprises: a defect position identification sub-model configured to mark a position of the defect in the image to be detected;
 the defect position identification sub-model is an object detector;
 the defect position identification sub-model is obtained by training the object detector based on an original data set;
 the training the object detector based on the original data set comprises:
 acquiring the original data set comprising a plurality of images to be detected with known defects; and
 classifying first regions corresponding to defects of all classifications of defects in the plurality of images to be detected with known defects into one classification as a foreground and classifying regions outside the first regions in the plurality of images to be detected with known defects into the other classification as a background such that the object detector only distinguishes between the foreground and the background when the object detector is trained, to identify only positions of the defects.

* * * * *